Figure 1:
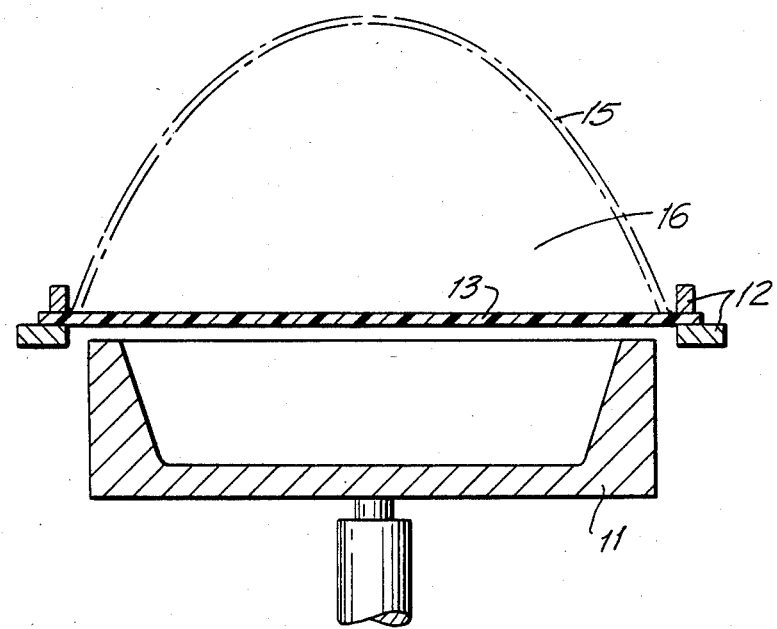

United States Patent [19]

Puehler

[11] Patent Number: 4,704,081
[45] Date of Patent: Nov. 3, 1987

[54] DEVICE FOR SHAPING SYNTHETIC RESINS

[75] Inventor: Horst Puehler, Muehltal, Fed. Rep. of Germany

[73] Assignee: Röhm GmbH, Darmstadt, Fed. Rep. of Germany

[21] Appl. No.: 856,776

[22] Filed: Apr. 23, 1986

[30] Foreign Application Priority Data

May 8, 1985 [DE] Fed. Rep. of Germany ....... 3516467

[51] Int. Cl.$^4$ ............................................. B29C 33/18
[52] U.S. Cl. ................................... 425/399; 264/337; 264/550; 425/406; 425/412
[58] Field of Search ....................... 264/337, 550, 554; 425/399, 406, 412

[56] References Cited

U.S. PATENT DOCUMENTS

| | | | |
|---|---|---|---|
| 2,368,327 | 1/1945 | Rose | 425/406 |
| 2,442,338 | 6/1948 | Borkland | 264/554 |
| 2,714,226 | 8/1955 | Axelrad | 264/337 |
| 2,990,581 | 7/1961 | Rowe, Jr. | 264/550 |
| 3,173,974 | 3/1965 | Mohr | 264/337 |
| 3,529,321 | 9/1970 | Culand | 425/406 |
| 3,608,016 | 9/1971 | Holmstrom | 264/554 |
| 3,737,276 | 6/1973 | Hill et al. | 425/406 |
| 3,969,051 | 7/1976 | Hovila | 425/406 |
| 3,975,493 | 8/1976 | Tigner et al. | 264/313 |
| 4,261,775 | 4/1981 | Tschudin | 264/554 |
| 4,285,901 | 8/1981 | Yotsutsuji et al. | 264/337 |
| 4,562,032 | 12/1985 | Gandreau | 264/338 |

FOREIGN PATENT DOCUMENTS

| | | | |
|---|---|---|---|
| 232713 | 10/1964 | Austria | 264/550 |
| 2455256 | 8/1977 | Fed. Rep. of Germany . | |
| 3010426 | 5/1981 | Fed. Rep. of Germany | 264/554 |

OTHER PUBLICATIONS

Airslip Forming, The Rubber and Plastics Age, Jul. 1956, pp. 460, 461.

Primary Examiner—Tim Miles
Attorney, Agent, or Firm—Curtis, Morris & Safford

[57] ABSTRACT

Molds or auxiliary molds for thermoforming a synthetic resin, said molds having a rigid main part connected surface-to-surface to an elastic layer having a smooth, continuous, matte surface which is more elastic than a softened resin with which it is to be contacted; devices for thermoforming comprising one or more of such molds; methods for thermoforming employing such molds and devices.

5 Claims, 3 Drawing Figures

DEVICE FOR SHAPING SYNTHETIC RESINS

The present invention relates to molds for thermoforming a synthetic resin, to thermoforming devices comprising such a mold, and to methods for thermoforming a thermoelastically softened sheet of synthetic resin employing such molds and devices.

Thermoforming molds are to be understood herein as devices employed in the method of thermoforming to act in such a way as to impose a shape on a softened synthetic resin, particularly a sheet thereof, and to maintain that action until the resin cools below its softening temperature. Auxiliary thermoforming molds, on the other hand, act only briefly on the softened resin and are removed from the resin before it cools below its softening temperature, so that the resin can be further formed.

A number of thermoforming methods involving molds, auxiliary molds, or both are described in the Imperial Chemical Industries Ltd. brochure, "Acrylic Materials/Shaping by Heat Forming" (London, 1960). It is as a rule impossible in these methods to prevent the tool or auxiliary tool from leaving traces on the surface of the thermoformed sheet, to the detriment of its original luster and uniformity. These traces occur even if the inner surface of the mold has been highly polished or if the mold—as an auxiliary thermoforming mold—is only temporarily contacted with the softened synthetic resin. These mold traces can in practice be reduced, although not actually eliminated, by lining the surface of the mold with a layer of soft, nappy material, which not only prevents the outermost surface layer of the resin from cooling too rapidly but also does not force otherwise unavoidable particle of dust into the soft surface of the sheet.

A conventional practice involves first forming a dome in a thermoelastically softened sheet of a synthetic resin using excess gas pressure, then introducing a mold into the concave portion of the dome, permitting the dome to shrink back by reducing the gas pressure until the resin comes into contact with the mold, and then pulling the resin into close conformity with the mold surface by the application of a vacuum. This, however, has the disadvantage that the synthetic resin at the zenith of the dome becomes attenuated as a result of its strong extension and is subject to rupture. To reduce or avoid such attenuation and rupture, auxiliary mold pieces have been employed to prevent excessive doming, but it is not possible to avoid leaving impressions of the mold and auxiliary mold on the surfaces of the molded resin article.

German Patent No. 2 455 256 discloses producing hollow pieces from thermoplastic resins by means of an expanding die that acts as an auxiliary thermoforming mold. The expanding die consists of a number of plates that can be spread apart and that are surrounded by a hood of elastic material. The softened resin is pressed into a mold by the die, stretched by spreading the plates, and then lifted off the die and forced against the wall of the mold by increased unilateral pressure.

The elastic material that constitutes the hood in this known thermoforming mold is not connected surface-to-surface with the plates of the die and the plates actually slide over the inner surface of the hood as they spread. The hood is intended to prevent the occurrence of tenuities and wrinkles in the thermoformed sheets. Since this method effects contact with the interior surface of a hollow piece, the problem of maintaining exterior surface quality is not addressed. Thus, the surface quality of the elastic material that the hood is made out of is also of no significance. The only important factor is for the hood to be elastic enough to allow the plates to spread.

The present invention relates generally to methods and devices wherein a thermoelastically softened synthetic resin, usually in sheet form, enters into surface-to-surface contact with a rigid mold and/or auxiliary mold having an intermediate elastic layer and is at least briefly formed by a tool.

One object of the invention is to improve a method of the aforesaid type by decreasing its deleterious effects on the surface of the resin being formed. The object in particular is to maintain surface luster and prevent any irregularities that would spoil the desired appearance of the surface. Irregularities of this type are especially deleterious to highly lustrous pieces and can result in non-uniform shininess even if their deviations from the desired geometry are too slight to measure.

This object is attained in the method of the invention by contacting those surfaces of the softened resin which are to be free of irregularities with rigid thermoforming molds or auxiliary thermoforming molds which are connected, at those points where the mold forms the softened resin, with a flexible layer of a material having a smooth and continuous matte surface and which is more flexible than the softened resin, said mold and flexible layer being connected over their surfaces at these points.

Figure 2:
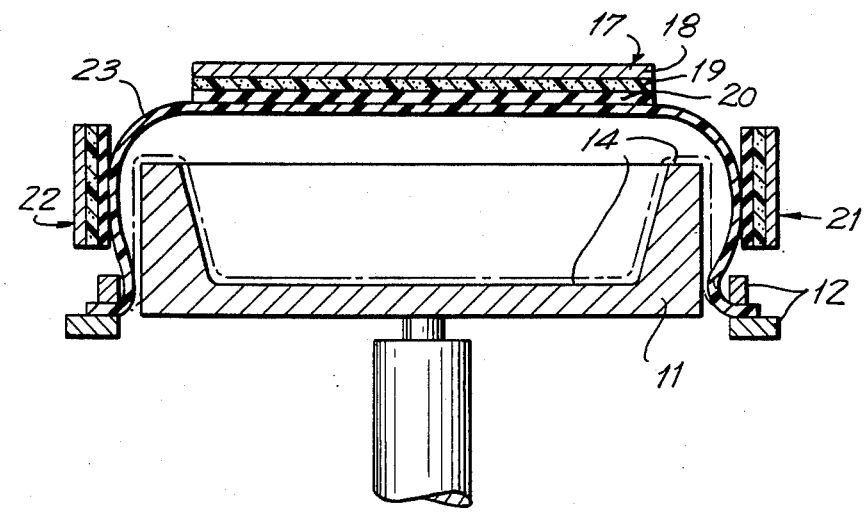
Figure 3:
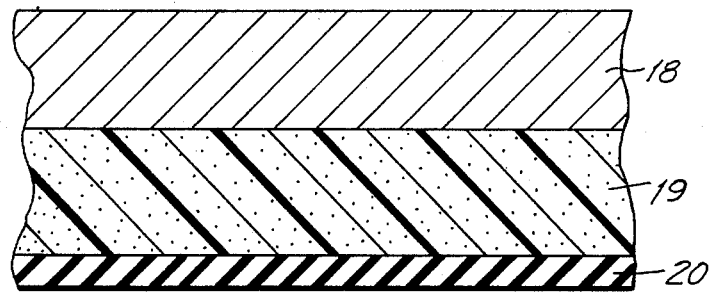

A better understanding of the present invention will be had by referring to the accompanying drawings in which FIG. 1 is a slide view, in section, of a molding device according to the prior art showing the molding of a concave article (e.g. bathtub or wash basin) by prior doming;

FIG. 2 is a side view, in section, of a molding device according to the present invention using novel thermoforming molds according to the invention to preserve the luster and unmarked character of the concave surface of an article produced in such a device; and FIG. 3 is a side view, in section, of a thermoforming mold according to the invention.

More in particular, FIG. 1 shows thermoelastically softened synthetic resin sheet 13 stretched over frame 12 for forming in mold 11, e.g. to form a bathtub. Mold 11 is in positive contact onbly against the bottom of sheet 13 of resin and accordingly the mold does not need to be lined with an elastic layer because this portion of the tub is generally enclosed and not visible when installed.

Referring to FIG. 1, if mold 11 were simply raised against thermoelastically softened resin sheet 13 stretched over fram 12, the rim and bottom of the tub produced from the stretched sheet would be undesirably thin. It is accordingly common in the prior art preliminarily to free-form sheet 13 into dome 15 (represented by the broken lines in FIG. 1), to introduce mold 11 into cavity 16 inside said dome, and then to force said preliminarily shaped dome 15 against mold 11 by first decreasing the pressure and finally applying a vacuum.

For instance, to thermoform a tub having a rim about 500 mm high, dome 15 must be preliminarily formed to a height of about 1000 mm, necessitating the use of a high forming pressure, for example, of 2 bars. However, preliminarily formed dome 15 at such a pressure can rip under certain conditions or can tear while mold 11 is being introduced, spoiling the whole sheet.

In the method in accordance with the invention as shown in FIG. 2, resin sheet 23 is preliminarily formed by doming until it comes to rest against auxiliary mold 17. Mold 17 consists in accordance with the invention (cf. FIG. 3) of rigid base layer 18 such as of wood, metal, or plastic, optional insulating layer 19 such as of polymethacrylimide foam and suitably about 20 mm thick, and of layer 20 such as of resilient roughened para rubber with a Shore hardness of 43, suitably about 3 mm thick. If necessary, other similar auxiliary molds 21 and 22 can be employed further at each side to prevent sheet 23 from doming excessively. The expansion of sheet 23 is limited by auxiliary molds 17, 21, and 22, preventing it from ripping due to pressure. At this stage, mold 11 can be introduced into the space inside domed sheet 23 as shown in FIG. 2. Resin sheet 23 is then separated from the auxiliary molds 17, 21, and 22 by decreasing the pressure and is forced against mold 11 by vacuum, forming molded piece 14 (shown by the broken lines). Once piece 14 has cooled below softening temperature, mold 11 is lowered, auxiliary molds 17, 21, and 22, which can also be combined into a box, are raised, tensioning frame 12 is released, and piece 14 removed. If a high-luster acrylic glass is employed as the synthetic resin, the upper (visible) concave surface of the tub will be perfectly lustrous, although a number of defects would be visible if auxiliary molds of some other material had been used. If desired, mold 11 may also be provided with an elastic layer and optional insulating layer also to provide an unmarked convex surface on the article produced.

To avoid deleterious traces on the surface of the finished piece it is essential that elastic layer 20 of FIG. 3 be connected surface-to-surface and be completely supported by base layer 18 at least at the points where the mold acts on the softened resin to form it. The shape of the mold is accordingly completely determined by its rigid base layer 18. The elastic hood in the tool in German Patent No. 2 455 256 on the other hand is not connected surface-to-surface with and completely supported by any main part of a mold between the mold and the spread-out plates, but constitutes an elastically tensioned skin that can yield more or less to the opposing pressure of the softened plastic sheet. It is accordingly impossible to avoid traces of the plates at the edges of the area of the elastic sheet supported by the plates. In the method in accordance with the invention, on the other hand, elastic layer 20 is permitted to be freely stretched and, hence, without surface-to-surface support by rigid base layer 18 of the mold only at those points of the mold that do not act on the sheet in such a way as to form it, for example, within a flat area.

The elasticity of layer 20 comes into play only within the layer itself, if, for example, there are particles of dust between the surface of the mold and the softened resin. Since elastic layer 20 is softer than the softened resin, dust particles will be forced into the layer more powerfully than into the sheet. The position of the side of elastic layer 20 that rests against rigid base layer 18 of the mold will be unchanged.

Traces from the elastic layer itself are avoided by providing it with a smooth and continuous surface. For example, soft foam layers with porous surfaces are inappropriate. A surface is to be understood as being smooth if it has no textural features such as elevations, burrs, furrows, or cavities larger than 0.1 mm. A certain amount of matte or roughness, however, is necessary and can be obtained by roughening with 240 grade abrasive paper.

Unsightly mold traces can be eliminated practically entirely with the method in accordance with the invention if an auxiliary thermoforming mold having the elastic layer thereon contacts the softened resin only for a limited time during the thermoforming process and is separated from the resin again before the resin cools below softening temperature.

The method and device of the invention are mainly intended for thermoforming high-luster resin sheets into high quality pieces such as bathtubs and similar personal sanitation installations. Whereas simple pieces like lamp domes can be manufactured without thermoforming molds, bringing the visible side of a sheet or piece at least briefly into contact with thermoforming molds or auxiliary thermoforming molds is often unavoidable in manufacturing more complicated shapes. This can be done using the method according to the invention without detriment to surface quality, especially luster, even when the mold exerts considerable force on the surface.

The resin sheets that are of principal interest herein are thermoelastically deformable plastic slabs 1 to 15 mm thick. The permissible dimension depends on the measurements of the piece being manufactured and on the size of the thermoforming machine. Sheets having an area 0.1 to 10 $m^2$ are conventional.

Resins that can be processed thermoelastically include, for example, polystyrene, polyvinyl chloride, cellulose ester, and especially polymethyl methacrylate (i.e. acrylic glass). In the thermoelastic state, which occurs at temperatures of approximately 100° C. to 200° C. for the resins in question, they are elastic and are linearly extensible by at least 70 percent.

The thermoforming molds or auxiliary thermoforming molds include rigid base layer 18 of wood, metal, or plastic that must be strong enough to exert enough force elastically to deform the softened resin sheet. Elastic layer 20 is usually 0.1 to 10 mm thick. Thinner layers will not prevent particles of dust from leaving traces on the surface of the plastic. There is no advantage to thicker layers and they are more expensive. It is practical for auxiliary thermoforming molds, from which the resin sheet must be separated during the thermoforming process and while still in the thermoelastic state, to have intermediate layer 19 of a heat insulating material, hard or soft foam for example, below elastic layer 20. Polymethacrylimide and polyether foams are appropriate, for example.

The elastic layer must be more elastic, i.e. softer than the thermoelastically softened resin subject to the conditions of thermoforming. It must, naturally, also be able to resist the temperatures and forces that occur during thermoforming. A material with properties that narrowly comply with the demands and processing temperature of the particular plastic being thermoformed must accordingly be selected.

Force-expansion curves are known for all appropriate resins. The material selected for the elastic layer will preferably have, even at room temperature, a curve below (and hence at higher expansion values) that of the thermoelastically softened resin sheet. This should hold at least at the deformation temperature.

Sheets of acrylic glass deform at 140° C. to 200° C. Appropriate elastic layers for processing acrylic glass can be made, for example, out of lightly vulcanized (para) rubber, soft fluorinated rubber, ionically crosslinked polyacrylates, or silicone rubber. The Shore hardness at room temperature (20° C.) is preferably below 80 and, especially, below 50.

In accordance with the invention, elastic layer 20 is connected surface-to-surface with rigid main part 18 of the mold at least at the points where the mold acts on the softened resin in such a way as to form it. This connection does not have to be capable of being released. Rather, it is only necessary for the elastic layer not to be displaced relative to the main part of the mold while in contact with the softened resin. It is practical for the elastic layer to be completely cemented to the main part of the mold. In many cases it is sufficient to cement or otherwise fasten just the edge of the elastic layer to the main part of the mold.

The molds are employed in a known way to thermoform the plastic sheet, which is stretched on a frame. The softened plastic sheet is preferably secured against the surface of the mold by means of increased or decreased pressure against one side. Generally, a mold covered with an elastic layer in accordance with the invention is employed only to thermoform the visible surface, whereas the reverse of the sheet can be processed with a conventional non-elastic mold.

What is claimed is:

1. A device for thermoforming a thermoelastically softened sheet of synthetic resin, said device comprising a tensioning frame for holding said softened sheet at the edges thereof, means for altering gas pressure on at least one side of said tensioning frame and softened sheet and, on the other side of said tensioning frame and softened sheet, first mold means comprising an elastic layer having a smooth and continuous matte surface adaptable to be brought into molding contact with said softened resin sheet, said elastic layer being more elastic than said softened sheet and being supported by a rigid base layer, resistant to deformation when said mold is brought into molding contact with said softened sheet, which base layer is affixed to said elastic layer in surface-to-surface relationship at least at those points at which said mold and softened sheet are brought into molding contact which deforms said softened sheet.

2. A device as in claim 1 additionally comprising moveable mold means on the same side of said tensioning frame as said gas pressure altering means and capable of moving through said tensioning frame toward said first mold means.

3. A device as in claim 1 wherein said first mold means additionally comprise a heat-insulating layer between said elastic layer and said base layer.

4. A device as in claim 3 wherein said heat-insulating layer is a foam layer.

5. A device as in claim 1 wherein said elastic layer is of a material having a share hardness less than 80° at 20° C.

* * * * *